United States Patent [19]

Maurer et al.

[11] Patent Number: 5,029,682

[45] Date of Patent: Jul. 9, 1991

[54] BRAKE SYSTEM FOR FULL-TRACK VEHICLES

[75] Inventors: Norbert Maurer, Friedrichshafen; Horst Kontny, Langenargen; Bernhard Binger, Ravensburg, all of Fed. Rep. of Germany

[73] Assignee: Zahnradfabrik Friedrichshafen AG, Fed. Rep. of Germany

[21] Appl. No.: 399,507

[22] PCT Filed: Mar. 2, 1988

[86] PCT No.: PCT/EP88/00153

§ 371 Date: Sep. 8, 1989

§ 102(e) Date: Sep. 8, 1989

[87] PCT Pub. No.: WO88/06990

PCT Pub. Date: Sep. 22, 1988

[30] Foreign Application Priority Data

Mar. 10, 1987 [DE] Fed. Rep. of Germany ....... 3707588

[51] Int. Cl.$^5$ ............................................. B60K 41/26
[52] U.S. Cl. ..................................... 192/4 B; 475/28
[58] Field of Search ......................... 192/4 B; 475/28

[56] References Cited

U.S. PATENT DOCUMENTS

| | | | |
|---|---|---|---|
| 3,044,320 | 7/1962 | Oudry | 475/28 |
| 3,425,296 | 2/1969 | Livezey | 475/28 X |
| 3,601,211 | 8/1971 | Finke | 475/28 X |
| 4,235,320 | 11/1980 | Polak et al. | 192/4 B |
| 4,377,094 | 3/1983 | Thompson et al. | 74/710.5 |
| 4,480,728 | 11/1984 | Bailey et al. | 192/4 B X |
| 4,497,219 | 2/1985 | Elsner | 192/4 B X |
| 4,796,486 | 1/1989 | Binger et al. | 74/606 R |

FOREIGN PATENT DOCUMENTS 2114951 5/1984 Fed. Rep. of Germany .
3538002 5/1986 Fed. Rep. of Germany .
2118644 11/1983 United Kingdom .

*Primary Examiner*—Rodney H. Bonck
*Attorney, Agent, or Firm*—Davis, Bujold & Streck

[57] ABSTRACT

A brake system for full-track vehicles having a shift gear (3) and superimposed steering gears (8) situated across the longitudinal axis (F) of the vehicle and two summing transmissions (5) situated near the two transmission output shafts (54). The shift gear and the superimposed steering gears, the same as the summing transmissions and other gears and devices, are situated as assemblies (A, B, C, D, E, P) in or upon a common housing and form a common transmission system. The brake system consists, in a first embodiment, of a secondary retarder (1) and a friction brake (2), both situated before the summing transmission. In normal braking, the secondary retarder (1) is first pressurized with the brake actuation device and only later is the friction brake (2) pressurized. In a second example of use a primary retarder (7) and a secondary retarder (1) are situated in the area of the shift gear, and the braking down to stoppage results from one or more shift brakes (B1, B2, B3) in a second function. Since all brakes are situated before the summing transmission, absolutely no impairment in the steering of the full-track vehicle results when braking.

1 Claim, 4 Drawing Sheets

BRAKE SYSTEM FOR FULL-TRACK VEHICLES

This invention concerns a brake system for full-track vehicles.

DE-C 21 14 951 disclosed such a brake system for a tracked vehicle including a superimposed steering gear consisting of one hydrodynamic brake, hereinafter in the specification designated as retarder, and two friction brakes, wherein the hydrodynamic brake/retarder is situated in the power path before the superimposed steering gear and the friction brakes behind the superimposed steering gear.

The periodical "Soldat und Technik", Apr. 4, 1967, pages 187-188, disclosed a brake system for a tracked vehicle having a superimposed steering gear and a foot and hand brake, wherein the so-called partial disc brake is situated between the transmission and the lateral countershaft and the foot brake is hydraulically operated with motor oil and the hand brake, which is at the same time parking brake, is mechanically operated.

Finally, DE-OS 35 38 002 disclosed a modern transmission system for full-track vehicles having assemblies that had been previously made and tested where, for instance, the retarder combined with the gear shift and both summing transmissions with the respective lateral covers are designed as assemblies. The friction brakes, not shown in this publication, are, as disclosed above, situated between the lateral countershaft upon which the caterpillar tracks are mounted and the transmission housing, that is, outside the lateral cover of the assembly with summing transmission.

All said designs have proved satisfactory, but require a high cost of construction based on the whole brake system and all designs impair the steering behavior when fully braking and when parking in the range of low speeds.

Starting with DE-DC 21 14 951, the problem to be solved by the invention is to improve and design, in relation construction cost, a brake system in a manner such that the actuation of the brake causes absolutely no impairment in the steering.

By supporting the friction brakes before the respective summing transmissions, it is possible to remove the steering impairment. The improvement is very effective specially in the range of low travelling speeds, since in this range the share of the friction brake in the total brake torque is very high. If there are provided two friction brakes directly connected with the driving wheel of the corresponding summing transmission, the dimensions can be such that the friction brake be situated in the lateral cover of the assembly with summing transmission. The difficulty in accessibility to the friction brake which results in such a system within the transmission housing is thus removed again. The lateral cover of the assembly with summing transmission and friction brake is very easily removable from the whole transmission housing and the access to the brake is thereby easily possible. If the brake discs of the friction brake also used for the parking brake and if the latter is also accommodated in the lateral cover of the assembly, a specially advantageous arrangement results and also a good accessibility for the parking brake. Except for the oil passage no construction expense is needed outside the transmission system for the necessary parking brake. If in addition to the secondary retarder known in such transmission systems there is also disposed a primary retarder, it is possible to brake down to almost modulation rate over a substantially broader speed range. At a speed below 6 km/h, for instance, the shift brakes present in a gear can then be also used as friction brakes. Primary and secondary retarders are specially favorably situated in the gear shift of the assembly.

The invention is not limited to the combination of features of the claims. Other logically possible combinations result for the expert from the claims and individual features of the claims in accordance with the stated problem.

Other details of the invention are explained with reference to drawings and embodiments. In the drawings.

Figure 1:
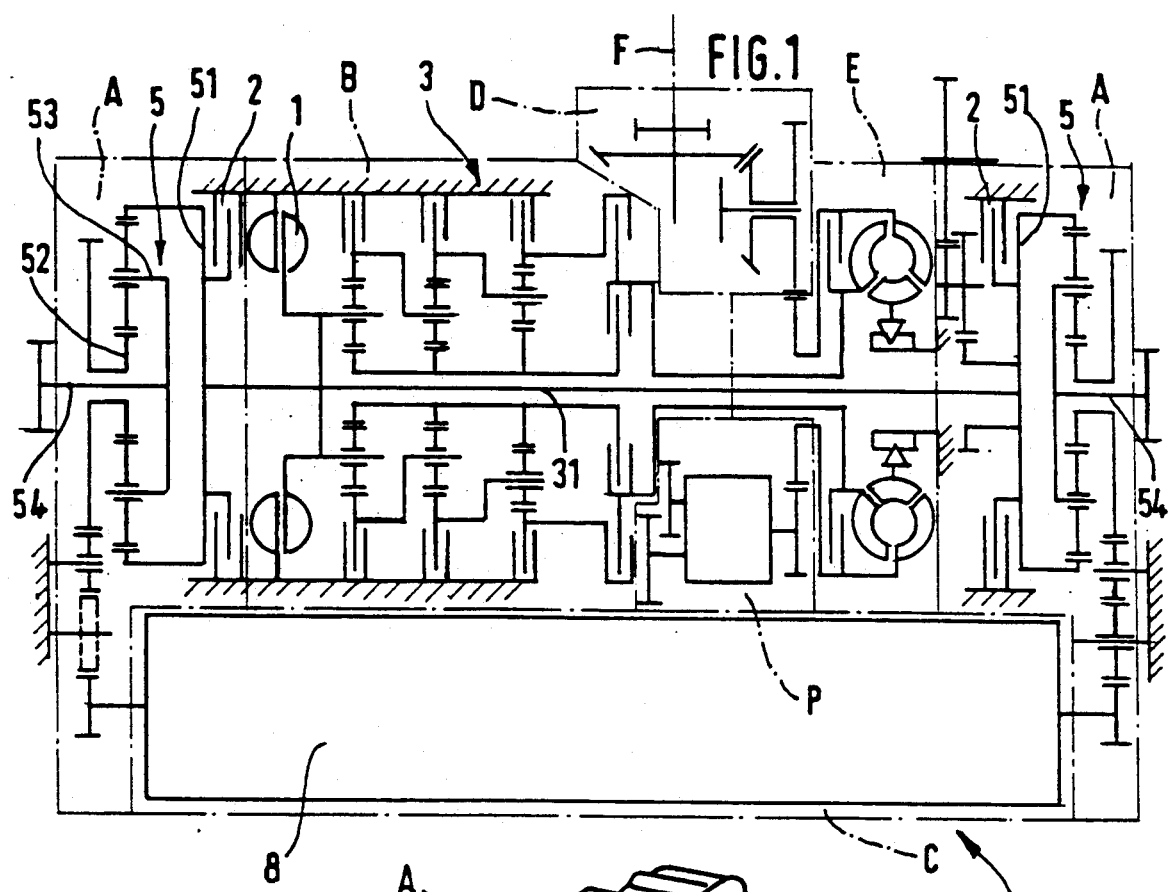
FIG. 1 shows diagrammatically a transmission system with a secondary retarder and two friction brakes respectively on the driving wheel of the summing transmission.

In the transmission system according to FIG. 1 is shown in an assembly B the shift gear 3 and a secondary retarder 1 and in the assembly A, which appears twice, there is shown each time a lateral cover with the summing transmission 5 and the friction brake 2. The other assemblies are the superimposed steering gears C and 8, the drive D, the torque converter E and the pump unit P, which form the transmission system with the not shown assemblies of fan drive, transmission control and housing insert.

Figure 2:
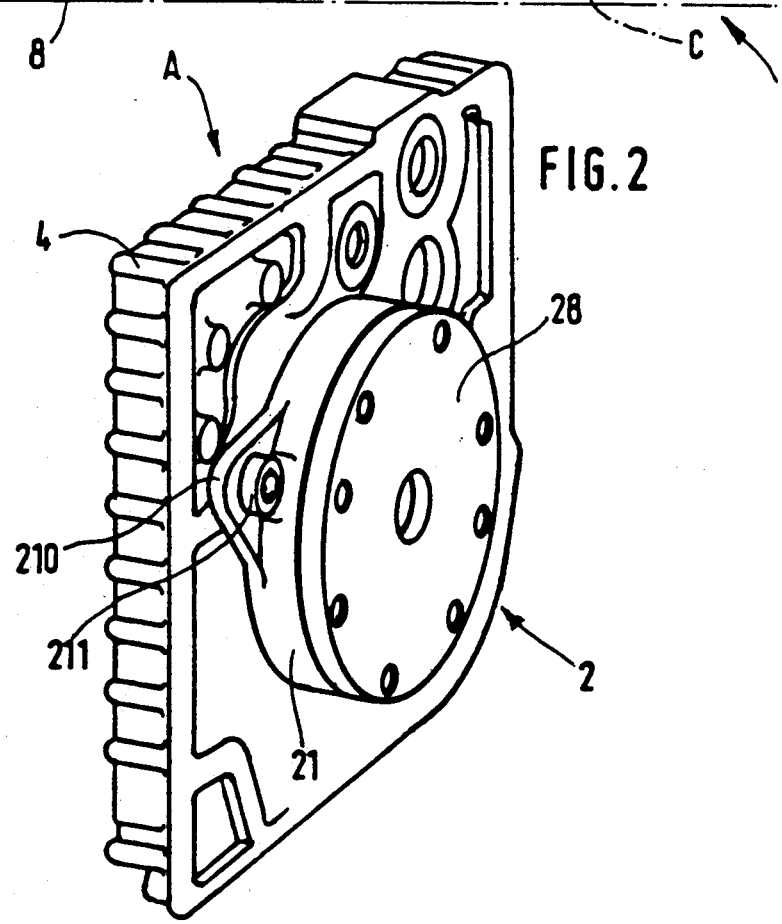
FIG. 2 shows the lateral cover and friction brake of the assembly.
Figure 3:
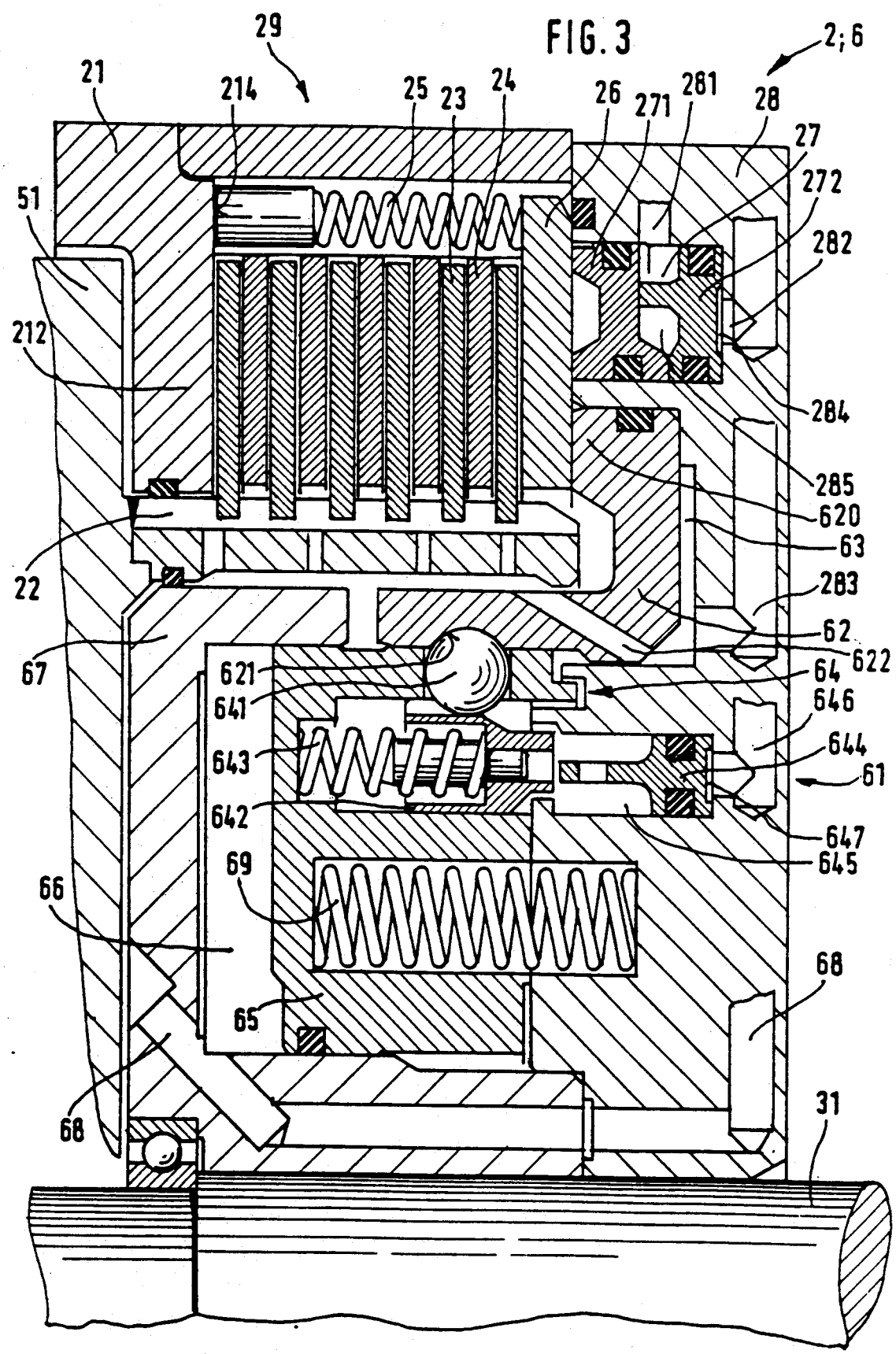
FIG. 3 shows in half section a friction brake with parking brake device.

FIG. 2 shows the assembly A. On the lateral cover 4, the housing 21 of the friction brake 2 is internally fastened via screws 211 combined with bearing eyes 210 so that with the removal of the assembly A the friction brake 2 is accessible after loosening said screws 211. Within the lateral cover 4 is also situated the summing transmission 5 which due to the friction brake shown is not seen in this Fig. In a half section according to FIG. 3 is shown by way of example a combined friction and parking brake 2;6. The internal disc carrier 22 is firmly connected such as by welding with the driving wheel—ring gear 51—of the summing transmission 5. The external discs of the combined friction and parking brake 2;6 are supported on the housing 21 which forms a disc carrier. This housing also has an inwardly oriented collar 212 on which are supported the discs (internal discs 23 and external discs 24). In the area of the engaging splines of the external discs there are circumferentially distributed recoil springs 25 supported on the collar 214 of the housing 21 and on the end disc 26. The brake 2 is biased into the open position by said springs 25 when not pressurized. In the area of the housing cover 28, near the end disc 26, is situated a piston space 27 with the pistons 271 and 272 of a twin-circuit system for pressurizing the service brake.

In the same axial plane, but radially inwardly in the same housing is also situated a locking and release device 61 of a parking brake 6 A piston 62 having radially outwardly oriented collar 620 is situated in a piston space 63 in the housing cover 28 in such a manner that it can act with the collar 620 likewise on the end disc 26 of the friction brake 2. Both pistons 62, 65 are connected by a detachable drag device 64 situated in a second piston 65. The drag device 64 consists essentially of balls 641 supported in the piston 65 which interact with the ball cups 621 situated in the piston 62. The piston space 66 for the second piston 65 is formed by a radially inwardly situated cup-shaped housing 67. To the drag device 64 belongs also a pressure ring 642 which, compressed by pressure springs 643, retains the balls 641 in the drag position. Opposite to the action of the pressure springs 643 there is also situated in a piston space 645 in the housing cover 28 a third piston 644 for releasing the drag device 64. In the housing cover 28 is also the cooling pipe 283 through which the cooling oil—transmission oil—for cooling the brake 2 is supplied in the piston 62, at least during the braking operation, via the piston space 63 and the ducts 622.

The brake system operates as follows: After actuating the brake, the retarder 1 is first filled with transmission oil in a manner known per se in the case of normal parking; thus, the output shaft 31 is braked by the shift gear 3. The effect of this braking acts also on both transmission output shafts 54 via the summing transmission 5. In case of emergency brakings or after going below a predetermined brake torque, the service brake—friction brake 2—is also actuated by the retarder 1. At the same time pressure oil coming from a source of fluid (pump, pressure tank) is supplied to the pressure spaces 281 and 282 such as via pipes 281 and 282. The pressure oil can be transmission oil or also brake oil conveyed from a separate source of fluid only for the friction brake 2. Thus, the piston 271 and also the piston 272 in case of failure in the pressure space 285 compress the end disc 26 into braking position against the pressure spring 25 so that the internal disc carrier 22 situated in the ring gear 51 is braked down via the outer and internal discs 24, 23. Since the ring gears 51 of the summing transmission 5 are fixedly connected with the output shaft 31 of the gear shift, the braking action of the friction brake 2 is added to the braking action of the retarder 1.

In the open position of the hand brake valve, that is, also during the operation of the friction brake 2, pressure oil is conveyed via the pipe 68 into the piston space 66 so that the piston 65 is compressed against the pressure of the springs 69 into the right end position. Over the balls retained in drag position by the drag device 64, the piston 62 is similarly adjusted to the right end position so that the collar 620 makes possible the open position of the end disc 26 via the spring 25.

In case of failure of the braking oil pressure or when closing the hand brake valve—parking position—the piston space 66 is ventilated and the strong springs 69 produce a movement of the piston 65 to the left. By the drag device 64, specially the balls 641, the piston 62 is dragged along and the collar 620 compressed for locking or emergency braking against the end disc 26. Thus, a braking down of the transmission output shafts 54 takes place in the manner described already via the lateral countershaft, not shown, of both tracks of the vehicle.

If pressure oil is again supplied to the piston space 66 by opening the hand brake valve, there results in the manner described already the adjustment to the right of the pistons 65 and 62, and the brakes are released. But also after an emergency braking combined with the failure of the pressure system it is possible to release the brakes. For this purpose it is necessary, for instance, via a small hand pump (not shown), to build up a pressure in the pipe 646 and in the pressure space 647 so as to move to the left the pressure ring 642 via the piston 644 and against the pressure springs 643. Thus, the balls 641 are pressed out from the drag position, since the piston 65 is pressed by the springs 69 against the end stop. The springs 25 now can move into the open position the end disc 26 and the piston 62. The pressure space 647 can immediately be ventilated again. Upon the pressurizing of the piston 65 with pressure oil that follows, the piston again moves to the right, and the pressure ring 642 is moved by the springs 643, and the balls 641 again produce the positive connection with the piston 62.

Figure 4:
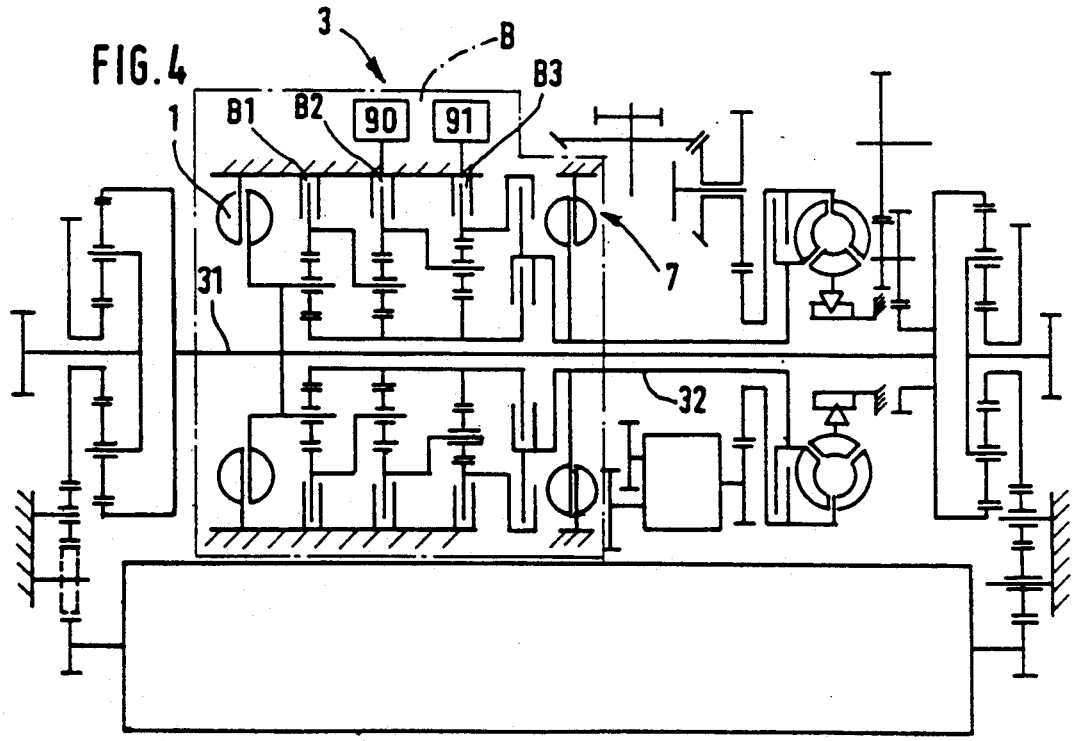
FIG. 4 shows a transmission system according to FIG. 1, but with a secondary and a primary retarder and shift brakes with coordinated proportional valves.
Figure 5:
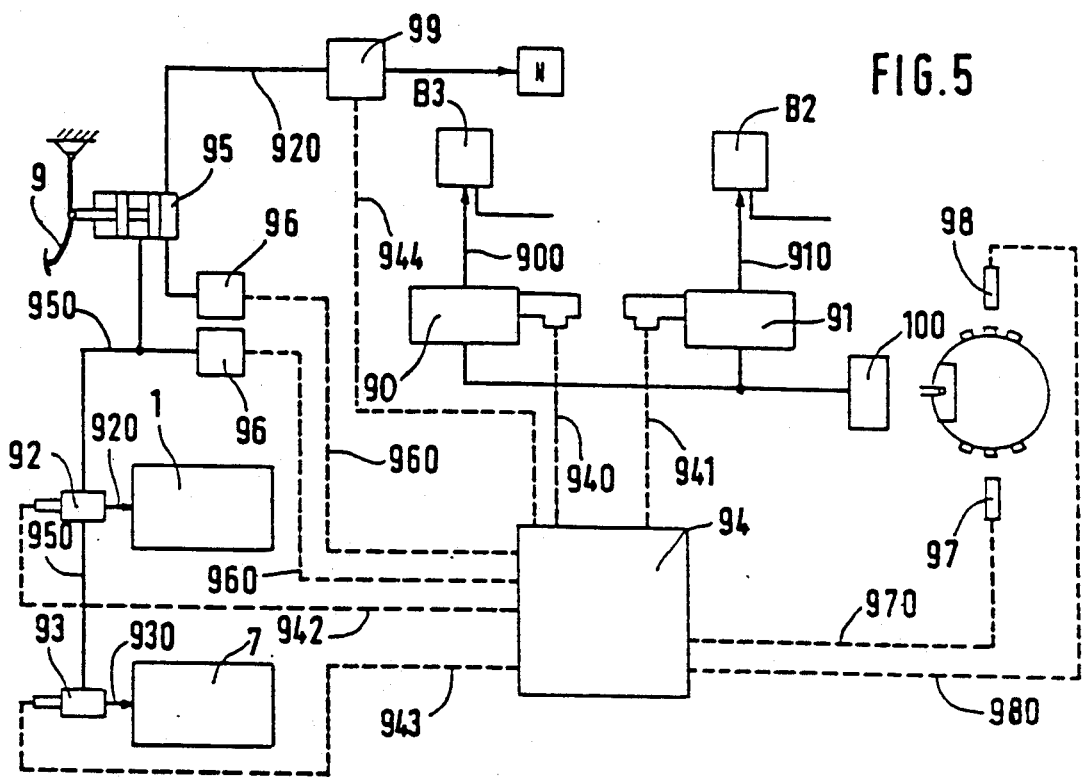
FIG. 5 shows an electro-hydraulic brake system according to the second embodiment (FIG. 4)

In a second embodiment according to FIG. 4, a primary retarder 7 is additionally situated within the assembly B with the shift gear 3 next to the secondary retarder 1 already shown in FIG. 1. As friction brakes for the speed range below 6 km/h there are used the shift brakes B2 and/or B3 which in first gear are certainly open. For this purpose is necessary, as shown in FIG. 5, to situate a second feed pipe 900, 910 with a proportional valve 90, 91 for each brake B2, B3. By said pipes pressure fluid such as transmission oil can be passed from the existing supply device of shift pressure such as a pump or a pressure tank 100 to the friction brakes B2, B3. The proportional valves 90, 91 are controlled via the control pipe 940, 941 by the electronic control device 94. The vehicle speed is determined by the speed of the transmission output shaft and fed as information by the sensors 97 and 98 via the lines 970, 980 to the electronic unit. The pressure produced via the brake pedal 9 in the tandem main cylinder 95 is fed as information to the electronic control device 94 via the sensors 96 in the lines 960. The whole signal processing for the total control takes place in the electronic control device in accordance with the stored logic. Hence, there are attached to the electronic control device 94 also the proportional valve 92 for the secondary retarder 1 via the line 942, the proportional valve 93 for the primary retarder 7 via the line 943 and the solenoid valve 99 for the emergency and parking brake via the line 944. A pressure pipe also leads from the main cylinder 95 to the proportional valves 92 and 93 coordinated with the primary retarder 7 and the secondary retarder 1.

Figure 6:
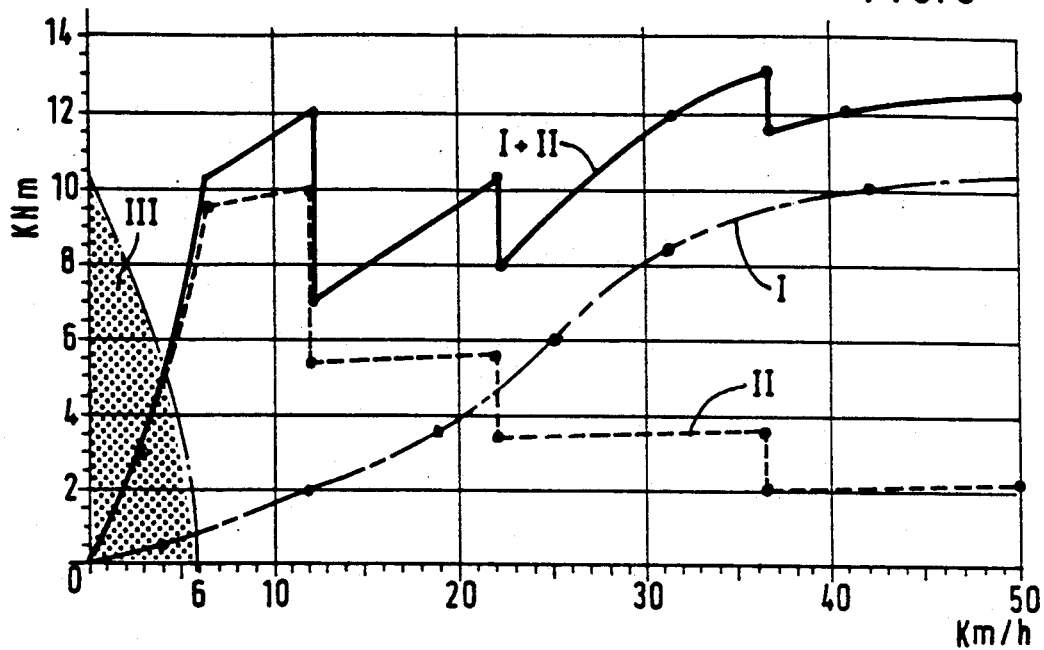
FIG. 6 shows a brake torque course with primary and secondary retarders according to the second embodiment.

The mode of operation of such an electrohydraulically regulated braking system can be understood from FIG. 6. While at speeds above 6 km/h, for instance, the activation of both flow brakes is as a rule sufficient—curves I and II—at speeds below said value, or after reaching said value, one or both disc brakes must be connected in order that a safe braking takes place until stopping. The operation of the individual flow brakes secondary retarder 1, primary retarder 7—can be deduced from curves I and II. The range of operation of the friction brake is shown with III. For an emergency braking both flow brakes 1, 7 are directly actuated via the hydraulic pipe 950 and the parking brake N such as a spring accumulation brake is activated via pipe 920 and valve 99.

Figure 7:
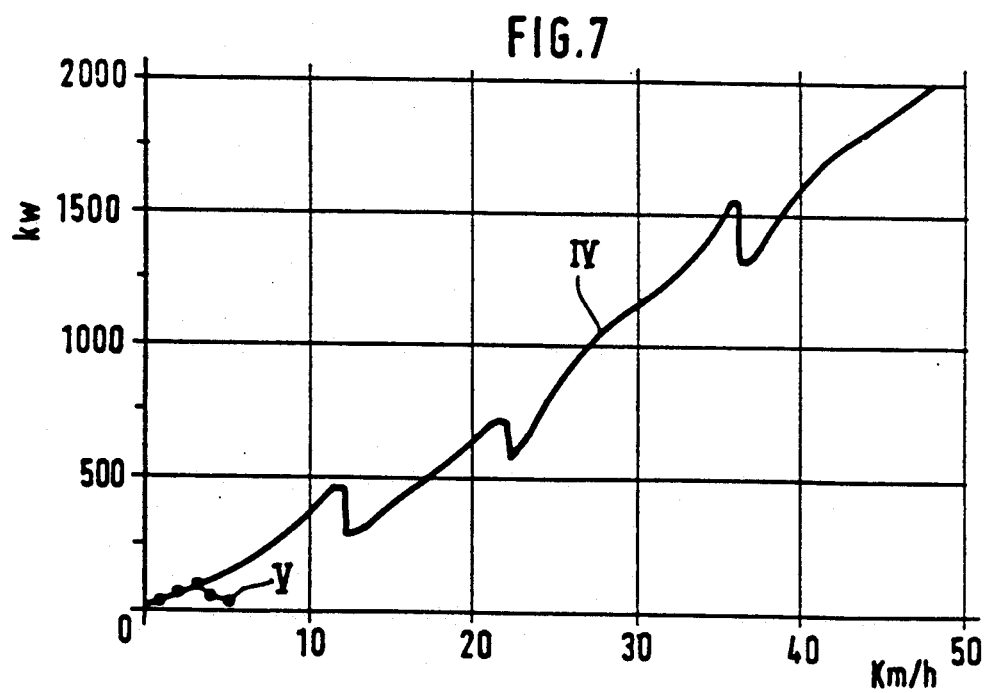
FIG. 7 shows a braking efficiency diagram according to the second embodiment.

As it can be easily understood from FIG. 7, the largest portion of the braking power is produced by the wear-free brakes, secondary retarder 1 and primary retarder 7—curve IV—. The share of the friction brake—curve V—is very small.

The invention is not exclusively limited to the embodiments shown, it being also possible only hydraulically to operate a primary retarder 7 and a secondary retarder 1 combined with the use of the gear-selector brakes B1, B2 and B3 as friction brakes Here the actuation of the brake for the wear-free flow brakes 1, 7 and the friction brakes B1, B2, B3 is produced only via the braking pedal 9.

We claim:

1. A brake system for a transmission system of a full-track vehicle in which the full track vehicle, defining a vehicle axis, has an integrated steering gear and a transmission both lying across the vehicle axis, said transmission system comprising:
   two output drives,
   a multiple gear transmission having an input and an output drive,
   a steering gear having two output drives, and
   two planetary gear sets each having first, second and third members,
   the output drive of said multiple gear transmission driving the first members of each said planetary gear sets, each output drive of said steering gear driving the second member of one of said two planetary gear sets, and the third members of each said planetary gear sets each driving one of the two output drives of said transmission system,
   the improvement wherein said transmission system further includes a brake system comprising at least one retarder (1) and at least one friction brake (2), the retarder is fluid brake which is activated via a brake actuation device (9) and the entire said brake system is situated in a drive path between said input drive of said multiple gear transmission and both of said planetary gear sets (5),
   each said planetary gear set is located within a lateral cover (4) and a friction brake is situated between the first member (51) of at least one of said planetary gear sets (5) and the lateral cover (4) thereof,
   a cylindrical housing (21) is connected to said lateral cover (4), via mounting screws (211), and said friction brake (2) is contained therein,
   said friction brake (2) is an oil disc brake which has a disc set (29) which also serves as a parking brake for said transmission system, and a locking and releasing device (61) is provided for engaging and disengaging said disc set (29),
   the friction brake (2) and the parking brake are combined as a single brake which is situated in the cylindrical housing (21) closed by a cover (28),
   said disc set (29) is situated radially outwardly and said locking and releasing device (61) is situated radially inward of said disc set (29) in a plane defined by said disc set (29),
   said locking and releasing device comprises a first piston (62) and a second piston (65) which are releasable connected to one another by a drag device (64), said second piston (65) of said locking and releasing device (61) is situated in a manner such that, when actuated, the second piston moves the first piston (62), via the drag device (64), into an open position for disengaging said parking brake (6) and when said second piston (65) is deactivated, pressure springs (69) situated between said cover (28) and said second piston (65) force, a via said drag device (64), said first piston (62) toward said disc set (29) and thereby engage the parking brake.

* * * * *